United States Patent [19]

Liao

[11] 4,068,266
[45] Jan. 10, 1978

[54] STATISTICAL RESOLUTION CONVERSION TECHNIQUE

[75] Inventor: Henry H. J. Liao, Carrollton, Tex.

[73] Assignee: Xerox Corporation, Stamford, Conn.

[21] Appl. No.: 692,420

[22] Filed: June 3, 1976

[51] Int. Cl.² .............................................. H04N 5/02
[52] U.S. Cl. .................................... 358/280; 358/140; 358/256
[58] Field of Search ............... 358/140, 263, 280, 260, 358/133, 138

[56] References Cited

U.S. PATENT DOCUMENTS

| 2,921,124 | 1/1960 | Graham | 358/138 |
| 3,051,778 | 8/1962 | Graham | 358/133 |
| 3,582,543 | 6/1971 | Davies etal. | 358/140 |
| 3,742,135 | 6/1973 | Baldwin | 358/140 |
| 3,970,776 | 7/1976 | Kinuhata | 358/140 |

Primary Examiner—John C. Martin

[57] ABSTRACT

A resolution converter for interfacing raster input and output scanners having different, predetermined resolution characteristics relies on a maximum likelihood interpolation process, whereby the conversion is carried out with minimum statistical error.

25 Claims, 5 Drawing Figures

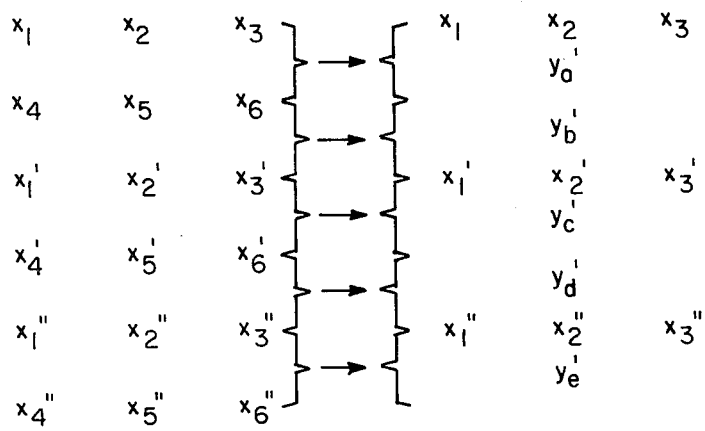
FIG. 2
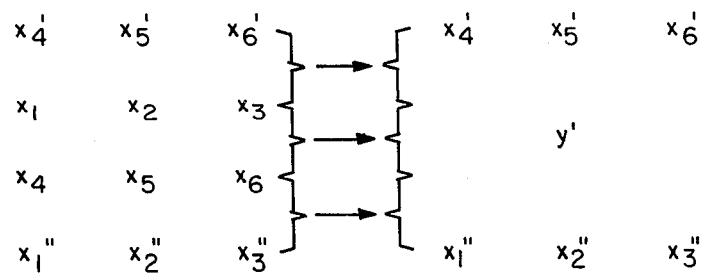
FIG. 4
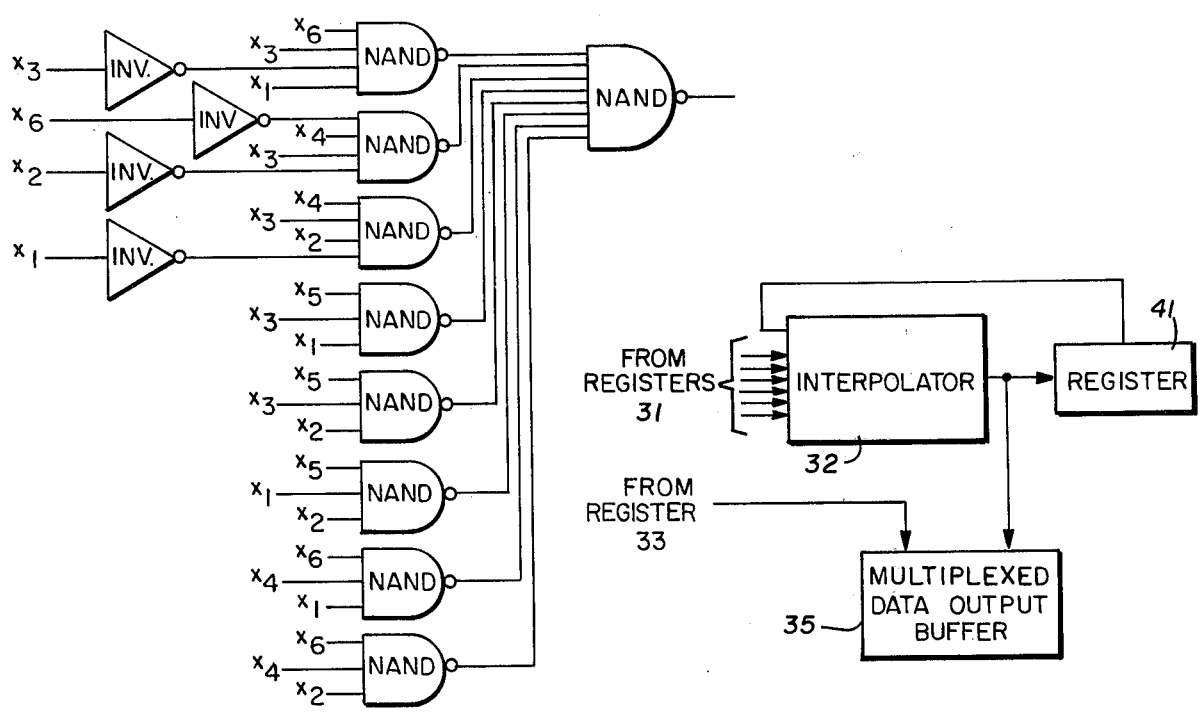
FIG. 3
FIG. 5

STATISTICAL RESOLUTION CONVERSION TECHNIQUE

BACKGROUND OF THE INVENTION

This invention relates to raster scanned imaging systems and, more particularly, to methods and means for electronically converting from one resolution to another. Accordingly, one of the more important applications of the present invention is in matching raster input and output scanners which operate with different resolutions.

By definition, an original document (whether it be a written or printed page, a drawing, a photograph, or anything else of like character) is a two dimensional, generally continuous pattern of reflectance. As is known, "raster input scanning" is a one dimensional sampling process for serially converting or re-mapping the image or information content of a document into a one dimensional video signal suitable for electronic processing and/or transmission. Conversely, "raster output scanning" is the complementary process for serially reconstructing or otherwise printing a document in response to such a video signal. Indeed, raster input and output scanning are in widespread commercial use in facsimile systems, to name just one of the better known types of "raster scanned imaging systems."

Resolution is one of the basic parameters of any raster input or output scanner. Typically, it is expressed in terms of a number of scan lines/inch vertically (i.e., the scan pitch) by a number of picture elements/inch horizontally (i.e., the sampling density). For example, the Xerox Telecopier 200 facsimile transceiver, which is manufactured and sold by Xerox Corporation, offers resolutions of 96 × 96 (at document transmission times of three and six minutes), 64 × 96 (at a document transmission time of four minutes), and 77 × 80 (at a document transmission time of two minutes).

Compatible raster input and output scanners are generally selected to have identical resolutions. A case in point is provided by the Xerox Telecopier 200 transceiver where the 96 × 96 six minute resolution and the 64 × 96 four minute resolution were included to provide backward compatibility with existing transceivers, including the Xerox Telecopier 400 units, which are also manufactured and sold by Xerox Corporation. To that end, provision was made in the Telecopier 200 transceivers for electromechanically varying the scan pitch (i.e., the vertical resolution) as a function of the document transmission time selected.

An attractive alternative is to carry out the resolution conversion electronically. Heretofore, however, that approach has been largely disregarded because the available techniques tend to introduce too much conversion error.

SUMMARY OF THE INVENTION

Accordingly, an object of the present invention is to provide improved methods and means for electronically converting from one resolution to another. In even more detail, an object is to provide methods and means for electronically carrying out the resolution conversion with minimum statistical error.

Another object of the present invention is to provide an electronic resolution converter of the foregoing type for interfacing raster input and output scanners having different resolutions.

To carry out these and other objects of the invention, an interpolator is constructed in accordance with predetermined probabilistic information to carry out a maximum likelihood prediction process so that the resolution conversion is performed with minimum statistical error.

BRIEF DESCRIPTION OF THE DRAWINGS

Still further objects and advantages of the present invention will become apparent when the following detailed description is read in conjunction with the attached drawings, in which:

FIG. 2 is a schematic diagram of an up-conversion process, such as may be performed by the converter shown in FIG. 1;

FIG. 3 is a schematic diagram of a hardwired logic circuit embodiment of the interpolator shown in FIG. 1;

FIG. 4 is a schematic diagram of a similar downconversion process; and

FIG. 5 illustrates a modification which may be made to the resolution converter shown in FIG. 1 to provide a recursive input prediction matrix.

DETAILED DESCRIPTION OF THE ILLUSTRATED EMBODIMENT

Figure 1:
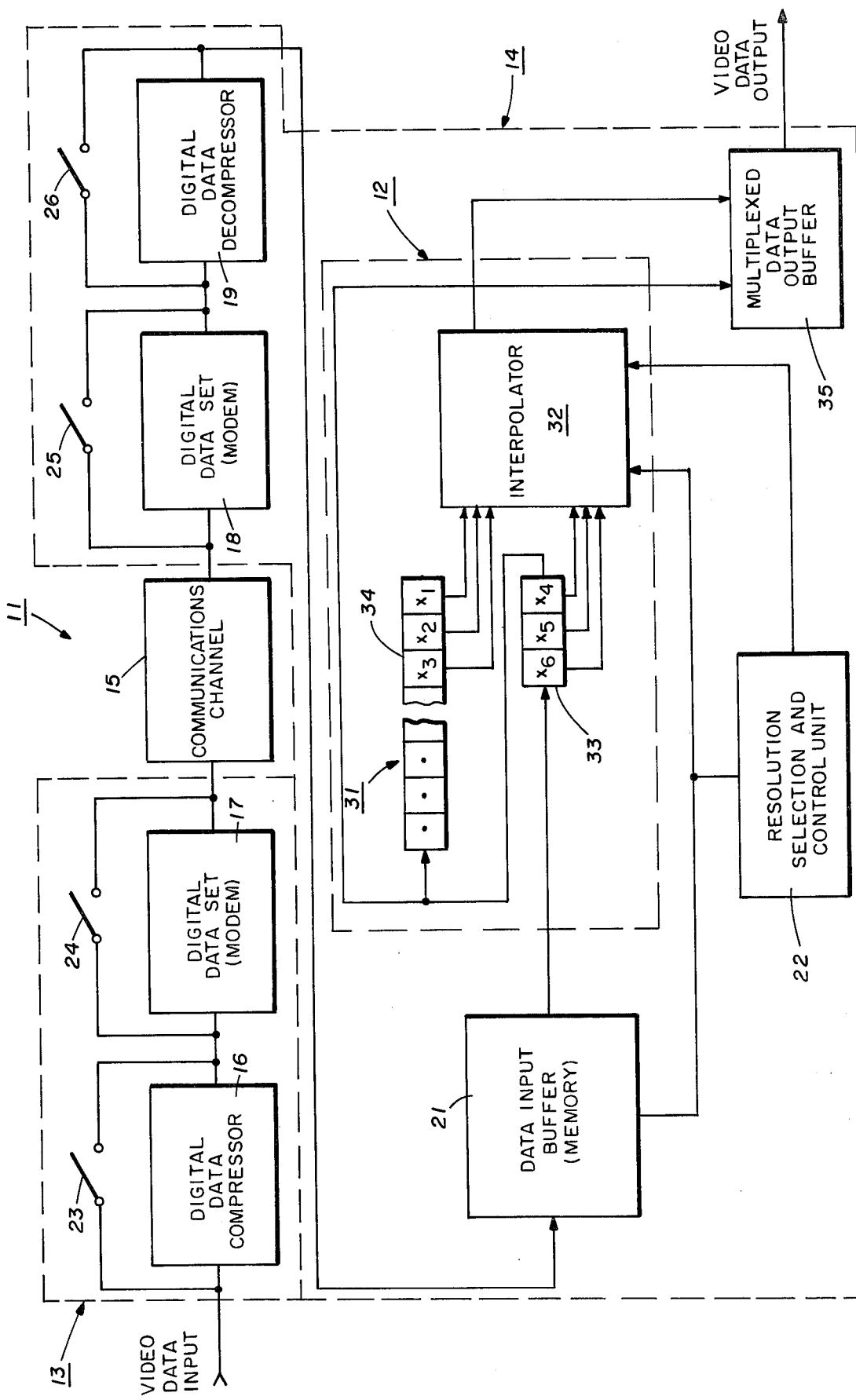
FIG. 1 is a simplified block diagram of a raster scanned imaging system including a resolution converter constructed in accordance with the present invention.

While the invention is described in some detail hereinbelow with specific reference to a certain exemplary embodiments, it is to be understood that there is no intent to limit it to those embodiments. On the contrary, the aim is to cover all modifications, alternatives and equivalents falling within the spirit and scope of the invention as defined by the appended claims.

Turning now to the drawings, and at this point especially to FIG. 1, there is a raster scanned imaging system 11 which includes a resolution converter 12 for electronically converting from one resolution to another. As illustrated, the imaging system 11 is a digital facsimile system having a transmitting terminal 13 and a receiving terminal 14 which are interconnected on, say, a demand basis by a communications channel 15.

In practice, there typically is a raster input scanner (not shown) within the transmitting terminal 13 for serially converting the information content of a subject copy (i.e., an original document) into a corresponding video signal. That signal is then operated on by an analog-to-digital converter (also not shown) so that a quantized or binary version of the video signal is applied to a digital data compressor 16. There, a predetermined source encoding process, such as run length encoding, is performed to eliminate redundant data. Subsequently, the digitally compressed signal is fed to a digital data set or modem 17 for transmission to the receiving terminal 14 via the communications channel 15.

At the receiving terminal 14, there is another digital data set or modem 18 for applying the incoming, digitally compressed video signal to a digital data decompressor 19 where the redundant data is more or less completely restored. The restored digital video signal is next fed into a data buffer or memory 21 for subsequent application to the resolution converter 12 in response to clock pulses supplied by a resolution selection and control unit 22. As explained in more detail hereinafter, the resolution converter 12 increases or decreases the effective scan pitch or vertical resolution of the video signal.

In the ordinary course, the converted video signal is then applied to a digital-to-analog converter (not shown) which, in turn, supplies a suitable drive signal for causing a raster output scanner to print the desired facsimile copy.

As will be appreciated, the resolution converter 12 overcomes the compatibility problems which have traditionally existed between raster input and output scanners having the same horizontal resolutions, but different vertical resolutions. The conversion process could, of course, be carried out equally as well in response to the original digital video signal. Consequently, to emphasize that point, there are switches 23–26 which may be closed to complete bypass paths around the data compressor 16, the data sets 17 and 18, and the data decompressor 19, respectively. The data buffer 21 is somewhat more important, even though it does not directly enter into the resolution conversion process, because raster input and output scanners which have different vertical resolutions or scan pitches also normally operate at different scanning rates or speeds. Hence, the data buffer 21 is provided to maintain a continuous flow of video data into the resolution converter 12 at a rate selected to satisfy the scanning speed of the raster output scanner and for a period of time sufficient to complete the printing of at least one full page of output or facsimile copy.

In accordance with the present invention, the resolution converter 12 performs a maximum likelihood interpolation process to increase or decrease the effective vertical resolution or scan pitch of the digital video signal. The up-conversion and down-conversion cases both rely on predictions based on predetermined probabilistic information to provide the video data elements for certain of the output scan lines. Specifically, predicted data elements are required for output scan lines which have no spatially corresponding input counterpart. The other output scan lines can either be filled with predicted data elements or with raw data elements from the spatially corresponding input scan lines. As a matter of definition, it should be noted that "spatially corresponding input and output scan lines" refer to those which occupy substantially identical positions on the subject (input) copy and the facsimile (output) copy, respectively.

Referring to FIGS. 1 and 2 for a more detailed description of the method and means for increasing the effective vertical resolution or scan pitch of the video signal, it will be seen that the video data elements stored in the input buffer 21 are serially shifted through a multi-stage register means 31 in response to clock pulses supplied by the resolution selection and control unit 22. Outputs from the first m and the last m stages of the register means 31 are coupled in parallel to separate inputs of an interpolator 32, thereby defining a two (2) $\times$ m input prediction matrix for the interpolator 32. Moreover, the register means 31 has $(m + k)$ stages, where "m" is a preselected matrix index and "k" is the number of picture elements or video data elements/scan line. Consequently, the video data elements within the prediction matrix at any given point in time represent m pairs of spatially corresponding picture elements from adjacent input scan lines. While a single bank of register stages would suffice, it is somewhat easier to visualize the register means 31 as comprising a first register 33 containing m stages followed by a second register 34 containing k stages.

To assemble an output video signal of increased vertical resolution, there is an output data buffer 35 having a pair of inputs which are multiplexed (i.e., alternately enabled and disabled) under the control of a control signal supplied by the resolution selection and control unit 22. One of the inputs of the buffer 35 is connected to receive predicted video data elements which are serially generated by the interpolator 32 as more fully explained hereinbelow, and the other input is connected to receive raw or unmodified video data elements which are serially shifted out of the final stage of the register 33. Moreover, the rate at which the inputs of the buffer 35 are multiplexed is a function of the resolution selected, whereby the raw and predicted video data elements are accepted by the buffer 35 for output scan lines which do and do not, respectively, have spatially corresponding input counterparts. For example, to increase the effective vertical resolution of the video signal from 64 lines/inch to 96 lines/inch, the rate at which the inputs of the buffer 35 are multiplexed is selected so that each set of three output scan lines has one line of raw video data elements followed by two lines of predicted video data elements. Likewise, a conversion from 96 lines/inch to 192 lines/inch requires that the inputs of the buffer 35 be multiplexed to accept the raw and predicted video data elements for alternate scan lines.

To carry out the present invention, the interpolator 32 relies on predetermined probabilistic information to predict a statistically likely output video data element in response to the logic levels of the input video data elements within the prediction matrix (i.e., the "matrix pattern") at any given time. The prediction process is repeated for each of the matrix patterns created as the input video data elements are shifted through successive stages of the registers 33 and 34. Furthermore, the clock pulses supplied by the resolution selection and control unit 22 are applied to the interpolator 32 to control the timing of the prediction process such that a prediction is made only after any transients which might appear at the inputs of the interpolator 32 have had an opportunity to settle out. For example, if the input video data elements are shifted as the clock pulses go to a high ("1") logic level, the predictions are suitably made as those pulses drop to a low ("0") logic level.

Preferably, the matrix index m is an odd integer so that the prediction matrix is symmetrical with respect to the output video data element being predicted. It must, or course, be greater than one to avoid the ambiguous, undefined case which would exist if the prediction matrix contained only two input video data elements of opposite logic levels. With that in mind, a preferred value for the matrix index m is three, which leads to a 2 $\times$ 3 prediction matrix. However, if the minor prediction errors that might be caused by an asymmetrical relationship between the prediction matrix and the data element being predicted can be tolerated, the m index could be an even integer.

More particularly, to collect the so-called probabilistic information for the interpolator 32, one or more sample documents, which are selected to more or less represent all input or subject copies as a general class, are pre-scanned. As will be recalled, it has been assumed that the raster input and output scanners operate with the same horizontal resolution. Hence, the pre-scanning is suitably carried out with that horizontal resolution. The vertical resolution for the prescanning is, on the other hand, selected to at least closely approximate a common integer multiple of the vertical resolutions at which the input and output scanners operate. For instance, if the input and output scanners have vertical resolutions of 64 lines/inch, 96 lines/inch, or 192 lines/inch, the pre-scanning can be carried out with a vertical resolution of only 192 lines/inch. However, if scanners having a vertical resolution of 77 lines/inch are also to be accommodated, the vertical resolution for the pre-scanning should be increased to 384 lines/inch (384 ÷ 5 ≈ 77).

The pre-scanning provides data which is analyzed to determine the frequency of the different input matrix patterns and to identify the actual logic levels of the video data elements which occupy the same positions with respect to the matrix patterns as the data element which is to be predicted (for convenience, that positional relationship is referred to hereinafter as "positioned for prediction"). As will be appreciated, each prediction matrix pattern may be expressed as a generalized terms:

$$X = (x_1, x_2, \ldots x_j) \quad (1)$$

where
$x_j$ = the logic level of the jth data element of the matrix; and
$j$ = twice the matrix index $m$ Accordingly, the frequency statistics define a probability distribution P(X), which gives the probability of the prediction matrix having any given matrix pattern X. Furthermore, the data on the actual logic levels of the data elements positioned for prediction may be used to identify a conditional probability distribution P(y/X), where y is an actual or observed logic level of the video data elements positioned for prediction in the presence of any given matrix pattern X. Thus, the probability distribution P(y/X) states the probability of any given logic level y being the most likely logic level for the video data element positioned for prediction in response to any given matrix pattern X.

If $y'$ is preselected as being the predicted logic level for the video data element positioned for prediction in response to any given matrix pattern X, the expected probability that the prediction will be in error is $$P_e = \sum_X \sum_{y \neq y'} P(\frac{y}{X}) P(X) \quad (2)$$

As a matter of definition:

$$\sum_{y \neq y'} P(\frac{y}{X}) = 1 - P(\frac{y'}{X}) \quad (3)$$

Consequently, the expected probability error $P_e$ is minimized if the logic level $y'$ for the video data element to be predicted in response to any given matrix pattern X is selected so that;

$$P(y'/X) \geq P(y/X) \text{ for all } y \neq y' \quad (4)$$

That is, in short, the maximum likelihood predictor.

As will be appreciated, a truth table giving the maximum likelihood predictors for the different matrix patterns which might be encountered in converting from one resolution to another may be prepared once the statistics are in hand. For example, the following truth table reflects the statistics collected by pre-scanning more or less standard printed text and is intended for use in converting from a vertical resolution of 96 lines/inch to 192 lines/inch:

| NO | X1 | X2 | X3 | X4 | X5 | X6 | y | FREQ. | ERROR INTERPOLATION |
|---|---|---|---|---|---|---|---|---|---|
| 1 | 0 | 0 | 0 | 0 | 0 | 0 | 0 | 2723620 | .0014 % |
| 2 | 0 | 0 | 0 | 0 | 0 | 1 | 0 | 15467 | .0340 % |
| 3 | 0 | 0 | 0 | 0 | 1 | 0 | 0 | 15276 | .1178 % |
| 4 | 0 | 0 | 0 | 0 | 1 | 1 | 0 | 42 | 7.1429 % |
| 5 | 0 | 0 | 0 | 1 | 0 | 0 | 0 | 537 | 3.9106 % |
| 6 | 0 | 0 | 0 | 1 | 0 | 1 | 0 | 9379 | 14.3086 % |
| 7 | 0 | 0 | 0 | 1 | 1 | 0 | 0 | 6 | 33.3333 % |
| 8 | 0 | 0 | 0 | 1 | 1 | 1 | 0 | 37 | 5.4054 % |
| 9 | 0 | 0 | 1 | 0 | 0 | 0 | 0 | 486 | 3.2922 % |
| 10 | 0 | 0 | 1 | 0 | 0 | 1 | 0 | 15 | 6.6667 % |
| 11 | 0 | 0 | 1 | 0 | 1 | 0 | 0 | 8553 | 12.0776 % |
| 12 | 0 | 0 | 1 | 0 | 1 | 1 | 0 | 33 | 12.1212 % |
| 13 | 0 | 0 | 1 | 1 | 0 | 0 | 1 | 84 | 17.8571 % |
| 14 | 0 | 0 | 1 | 1 | 0 | 1 | 1 | 54 | 38.8889 % |
| 15 | 0 | 0 | 1 | 1 | 1 | 0 | 1 | 46 | 30.4343 % |
| 16 | 0 | 0 | 1 | 1 | 1 | 1 | 0 | 40 | 45.0000 % |
| 17 | 0 | 1 | 0 | 0 | 0 | 0 | 0 | 15271 | .0736 % |
| 18 | 0 | 1 | 0 | 0 | 0 | 1 | 0 | 331 | 2.7190 % |
| 19 | 0 | 1 | 0 | 0 | 1 | 0 | 0 | 22121 | 1.2477 % |
| 20 | 0 | 1 | 0 | 0 | 1 | 1 | 0 | 81 | 13.5802 % |
| 21 | 0 | 1 | 0 | 1 | 0 | 0 | 0 | 8842 | 11.4454 % |
| 22 | 0 | 1 | 0 | 1 | 0 | 1 | 1 | 33920 | 45.6486 % |
| 23 | 0 | 1 | 0 | 1 | 1 | 0 | 1 | 6319 | 39.6582 % |
| 24 | 0 | 1 | 0 | 1 | 1 | 1 | 1 | 5966 | 11.1465 % |
| 25 | 0 | 1 | 1 | 0 | 0 | 0 | 0 | 1 | .0000 % |
| 26 | 0 | 1 | 1 | 0 | 0 | 1 | 2 | 0 | .0000 % |
| 27 | 0 | 1 | 1 | 0 | 1 | 0 | 1 | 6623 | 39.5440 % |
| 28 | 0 | 1 | 1 | 0 | 1 | 1 | 1 | 2 | .0000 % |
| 29 | 0 | 1 | 1 | 1 | 0 | 0 | 1 | 43 | 41.8605 % |
| 30 | 0 | 1 | 1 | 1 | 0 | 1 | 1 | 572 | 2.7972 % |
| 31 | 0 | 1 | 1 | 1 | 1 | 0 | 1 | 22283 | 1.1399 % |
| 32 | 0 | 1 | 1 | 1 | 1 | 1 | 1 | 12033 | .9225 % |
| 33 | 1 | 0 | 0 | 0 | 0 | 0 | 0 | 14978 | .1377 % |
| 34 | 1 | 0 | 0 | 0 | 0 | 1 | 0 | 21258 | 1.6511 % |
| 35 | 1 | 0 | 0 | 0 | 1 | 0 | 0 | 277 | 4.3321 % |
| 36 | 1 | 0 | 0 | 0 | 1 | 1 | 0 | 66 | 13.6364 % |
| 37 | 1 | 0 | 0 | 1 | 0 | 0 | 0 | 20 | .0000 % |
| 38 | 1 | 0 | 0 | 1 | 0 | 1 | 1 | 5985 | 39.7661 % |
| 39 | 1 | 0 | 0 | 1 | 1 | 0 | 2 | 0 | .0000 % |
| 40 | 1 | 0 | 0 | 1 | 1 | 1 | 0 | 7 | .0000 % |
| 41 | 1 | 0 | 1 | 0 | 0 | 0 | 0 | 9427 | 14.6494 % |
| 42 | 1 | 0 | 1 | 0 | 0 | 1 | 1 | 6440 | 40.3261 % |
| 43 | 1 | 0 | 1 | 0 | 1 | 0 | 1 | 32732 | 45.1882 % |

-continued

| N0 | X1 | X2 | X3 | X4 | X5 | X6 | y | FREQ. | ERROR INTERPOLATION |
|----|----|----|----|----|----|----|---|-------|---------------------|
| 44 | 1 | 0 | 1 | 0 | 1 | 1 | 1 | 6626 | 15.8316 % |
| 45 | 1 | 0 | 1 | 1 | 0 | 0 | 0 | 38 | 36.8421 % |
| 46 | 1 | 0 | 1 | 1 | 0 | 1 | 1 | 21353 | 1.2688 % |
| 47 | 1 | 0 | 1 | 1 | 1 | 0 | 1 | 553 | 5.7348 % |
| 48 | 1 | 0 | 1 | 1 | 1 | 1 | 1 | 12606 | 1.2261 % |
| 49 | 1 | 1 | 0 | 0 | 0 | 0 | 0 | 20 | 15.0000 % |
| 50 | 1 | 1 | 0 | 0 | 0 | 1 | 0 | 78 | 12.6205 % |
| 51 | 1 | 1 | 0 | 0 | 1 | 0 | 0 | 93 | 13.9785 % |
| 52 | 1 | 1 | 0 | 0 | 1 | 1 | 0 | 132 | 15.9091 % |
| 53 | 1 | 1 | 0 | 1 | 0 | 0 | 0 | 12 | 16.6667 % |
| 54 | 1 | 1 | 0 | 1 | 0 | 1 | 1 | 6528 | 14.3842 % |
| 55 | 1 | 1 | 0 | 1 | 1 | 0 | 1 | 11 | 36.3636 % |
| 56 | 1 | 1 | 0 | 1 | 1 | 1 | 1 | 403 | 14.3921 % |
| 57 | 1 | 1 | 1 | 0 | 0 | 0 | 0 | 35 | 14.2357 % |
| 58 | 1 | 1 | 1 | 0 | 0 | 1 | 1 | 7 | 23.5714 % |
| 59 | 1 | 1 | 1 | 0 | 1 | 0 | 1 | 5750 | 14.2087 % |
| 60 | 1 | 1 | 1 | 0 | 1 | 1 | 1 | 376 | 11.1702 % |
| 61 | 1 | 1 | 1 | 1 | 0 | 0 | 0 | 34 | 33.2353 % |
| 62 | 1 | 1 | 1 | 1 | 0 | 1 | 1 | 12274 | 1.1569 % |
| 63 | 1 | 1 | 1 | 1 | 1 | 0 | 1 | 12121 | 1.1055 % |
| 64 | 1 | 1 | 1 | 1 | 1 | 1 | 1 | 113164 | .5267 % |

BLACK COVERAGE = 8.92775 %
BLACK ERROR INTERPOLATION = 14.0684 %
AVERAGE ERROR INTERPOLATION = 1.61058 %

To realize the performance dictated by the truth table, the interpolator 32 may comprise appropriately programmed means, such as a programmable read only memory (PROM) or hardwired logic. In the interest of completeness, a NAND gate logic circuit for satisfying the foregoing truth table is shown in FIG. 3. This circuit was designed using computer assisted logic design techniques to express the truth table is an optimized logic function which was found to be (in standard logic notation):

$$y' = x_6 x_3 \bar{x}_2 x_1 + x_6 x_4 x_3 x_2 + x_4 x_3 x_2 \bar{x}_1 + x_5 x_3 x_1 + x_5 x_3 x_2 + x_5 x_4 x_2 + x_6 x_4 x_1 + x_6 x_4 x_2 \quad (5)$$

The interpolator 32 may, of course, be expanded to selectively perform anyone of a plurality of different vertical resolution conversions, including down-conversions as well as up-conversions. However, each conversion requires a separate truth table. Thus, the expansion of the interpolator 32 is most conveniently carried out by adding parallel memory or logic circuitry to the interpolator 32 so that each truth table may be independently satisfied. In that event, the appropriate portion of the interpolator 32 for carrying out a selected conversion may be readily accessed under the control of the aforementioned control signal supplied by the resolution selection and control unit 22.

Referring now to FIGS. 1 and 4, it will be evident that the down-conversion process may be carried out by essentially the same means as the up-conversion process.

Turning to FIG. 5, a recursive input prediction matrix may be realized by providing a single stage register 41 at the output of the interpolator 32 to capture the most recently predicted output video data element for application back to an additional input of the interpolator 32. Intuition suggests that more accurate predictions for the output data elements could be made if the logic level for the most recently predicted (i.e., the immediately proceeding) data element was known. However, the available informaton does not demonstrate that the recursive prediction matrix does, in fact, lead to a significant reduction in prediction errors.

CONCLUSION

In view of the foregoing, it will now be understood that the present invention provides a method and means for electronically converting from one resolution to another. As will be appreciated, a maximum likelihood interpolation technique has the advantage of performing the resolution conversion with minimum statistical error.

What is claimed is:

1. In a raster scanned imaging system, the improvement comprising a resolution converter for interfacing input and output terminals having different, predetermined vertical resolution characteristics;
   said input terminal including means for supplying a digital input signal containing a series of video data elements from successive input scan lines;
   said output terminal including means for responding to a digital output signal containing another series of video data elements for successive output scan lines;
   said resolution converter including
      multi-stage register means having a plurality of parallel outputs and a series output, said parallel outputs being taken from preselected stages of said register means to define a prediction matrix containing a plurality of input data elements from at least a pair of input scan lines,
      means for serially shifting the input data elements through said register means, thereby providing a series flow of raw input data elements at said series output while sequentially entering successive patterns of input data elements into said prediction matrix,
      interpolation means coupled to the parallel outputs of said register means for sequentially predicting statistically likely output data elements in response to said prediction matrix patterns,
      buffer means having one input coupled to receive said raw input data elements and a second input coupled to receive said predicted output data elements, and
      means for multiplexing the inputs of said buffer means at a rate determined by the ratio of the vertical resolutions of said input and output terminals, whereby said output signal is assembled by accepting raw data elements for certain of said output scan lines and predicted data elements for the other of said output scan lines.

2. The improvement of claim 1 wherein the output data elements predicted by said interpolation means in response to different prediction matrix patterns are preselected to provide minimum expected prediction error.

3. The improvement of claim 2 wherein said resolution converter is an up-converter.

4. The improvement of claim 3 wherein each of said prediction matrix patterns is symmetrical with respect to the output data element predicted in response thereto.

5. The improvement of claim 2 wherein said resolution converter is a down-converter.

6. The improvement of claim 5 wherein each of said prediction matrix patterns is symmetrical with respect to the output data elements predicted in response thereto.

7. The improvement of claim 2 wherein said input signal and said output signals are both binary signals, whereby said video input and output data elements have values from a set (0,1); and said input and output terminals are transmitting and receiving terminals, respectively, of a facsimile system.

8. The improvement of claim 1 wherein the output data elements predicted by said interpolation means in response to different matrix patterns are preselected on the basis of statistics selected from representative input copy so that $P(y'/X) \geq P(y/X)$ for all $y \neq y'$ where
P = probability;
X = a term representing any given matrix pattern;
y = an observed value for the data element positioned to be predicted in response to the given matrix pattern X; and
y' = the selected value for the data element predicted in response to the matrix pattern X, whereby a maximum likelihood predictor is provided for each of the prediction matrix patterns.

9. The improvement of claim 8 wherein said register means has $(m + k)$ series connected stages, where m is a predetermined integer greater than one, and k is equal to the number of data elements per input and output scan line; said parallel outputs are taken from the first m and last m stages of said register means to provide a two by m prediction matrix; and said series output is taken from a final stage of said register means.

10. The improvement of claim 9 wherein m is an odd integer, and each of said prediction matrix patterns is symmetrical with respect to the output data element to be predicted in response thereto.

11. The improvement of claim 9 wherein said input signal and said output signal are both binary signals, whereby the data elements from said input scan lines and for said output scan lines have values from a set (0,1).

12. The improvement of claim 11 wherein said resolution converter is an up-converter.

13. The improvement of claim 12 wherein m is an odd integer, and each of said prediction matrix patterns is symmetrical with respect to the output data element to be predicted in response thereto.

14. The improvement of claim 11 wherein said resolution converter is a down-converter.

15. The improvement of claim 14 wherein m is an odd integer, and each of said prediction matrix patterns is symmetrical with respect to the output data element to be predicted in response thereto.

16. A resolution conversion method for interfacing video input and output terminals having different, predetermined vertical resolutions, said method comprising the steps of
entering successive pluralities of video input data elements in a prediction matrix to sequentially define a series of matrix patterns, each of said matrix patterns including a plurality of input data elements from each of at least a pair of successive input scan lines,
predicting statistically likely values for successive output video data elements for certain output scan lines and using the input video data elements for the other of said output scan lines.

17. The method of claim 16 wherein the values predicted for the output video data elements in response to different matrix patterns are preselected to provide minimum expected prediction error.

18. The method of claim 17 further including a preliminary step of collecting statistics from representative input copy to define a probability distribution P(y/X) giving the likelihood of the output data element to be predicted in response to any given matrix pattern X having any given actual value y; and wherein the values y to be predicted in response to the different matrix patterns are preselected so that $P(y'/X) \geq P(y/X)$ for all $y \approx y'$.

19. The method of claim 18 wherein each of said prediction matrix patterns is symmetrical with respect to the video output data element predicted in response thereto.

20. The method of claim 18 wherein said input and output video data elements have values from a set (0,1).

21. The method of claim 20 wherein the predicted video data elements of said output signal are included to provide increased vertical resolution.

22. The method of claim 21 wherein each of said prediction matrix patterns is symmetrical with respect to the video output data element predicted in response thereto.

23. The method of claim 20 wherein the predicted video data elements of said output signal are included to provide reduced vertical resolution.

24. The method of claim 23 wherein each of said prediction matrix patterns is symmetrical with respect to the video output data element predicted in response thereto.

25. The method of claim 18 wherein said input and output terminals are transmitting and receiving terminals, respectively, of a facsimile system.

* * * * *